United States Patent [19]

Okamura et al.

[11] Patent Number: 5,593,103
[45] Date of Patent: Jan. 14, 1997

[54] REEL SPRING FOR TAPE CASSETTE AND METHOD FOR PREPARING IT

[75] Inventors: Masatoshi Okamura, Saku; Hiroshi Kaneda, Asashina-mura, both of Japan

[73] Assignee: TDK Corporation, Tokyo, Japan

[21] Appl. No.: 245,488

[22] Filed: May 18, 1994

[30] Foreign Application Priority Data

May 18, 1993 [JP] Japan ............................ 5-138906

[51] Int. Cl.$^6$ .......................... G11B 23/04; F16F 1/18
[52] U.S. Cl. .................... 242/345.2; 360/132; 267/158
[58] Field of Search ...................... 242/345.2; 360/132; 267/158, 160

[56] References Cited

U.S. PATENT DOCUMENTS

| 4,770,367 | 9/1888 | Carroll . | |
|---|---|---|---|
| 5,332,172 | 7/1994 | Tollefson | 242/345.2 |

FOREIGN PATENT DOCUMENTS

| 57-79983 | 5/1982 | Japan . |
| 59-3425 | 1/1984 | Japan . |
| 1154576 | 10/1989 | Japan . |
| 6-4977 | 1/1994 | Japan . |
| 6-19177 | 3/1994 | Japan . |
| 6-19178 | 3/1994 | Japan . |

*Primary Examiner*—John Q. Nguyen
*Attorney, Agent, or Firm*—Oblon, Spivak, McClelland, Maier & Neustadt, P.C.

[57] ABSTRACT

A reel spring for tape cassettes includes at least two mounting holes which are formed in the base portion at opposite sides with respect to a tape reel centerline connecting reel centers and in such a manner to be spaced in the direction of the tape reel centerline, and which is used for melt-bonding with the cassette housing. The base portion is arranged so as to have a center laid on the tape reel centerlines, respective end portions are arranged so as to have their centerlines passed through respective contact points for urging a pair of tape reels, extended in parallel with each other and deviated with respect to the tape reel centerlines. The width of the base portion is substantially the same as that of the end portions. The reel spring is prepared through a cutting step for cutting a stock up to positioning holes from opposite edges of the stock so that the cutting is made with the same width as the width of a reel spring end portion, along separation lines which deviate with respect to the tape reel centerline, extend in parallel with one another and pass in the vicinity of the mounting holes, the separation lines including separation lines for reel spring end portions at one side and separation lines for reel spring end portions at the other side which are out of alignment.

12 Claims, 6 Drawing Sheets

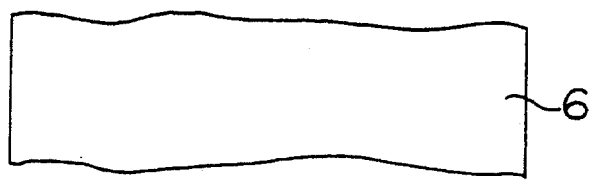
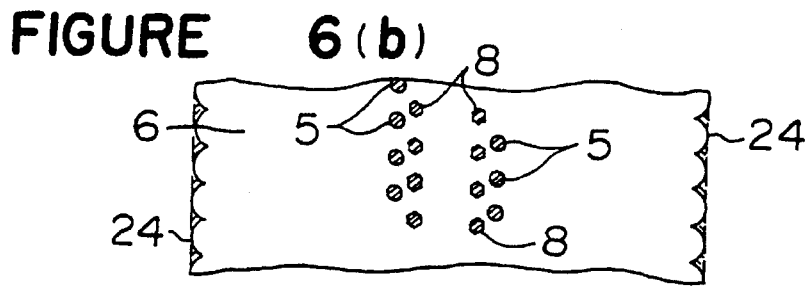
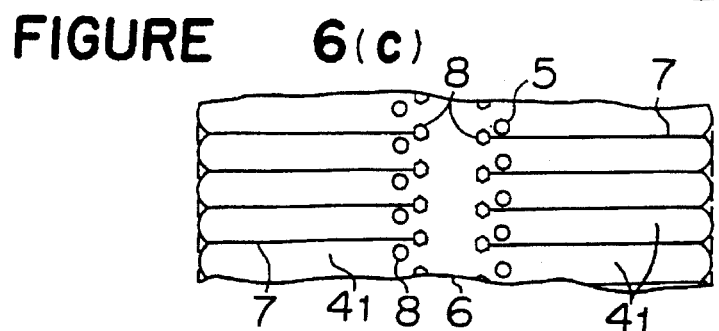
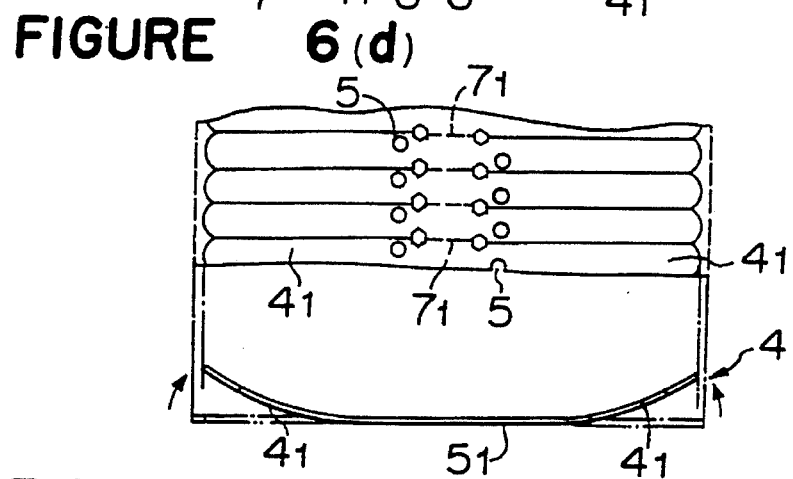
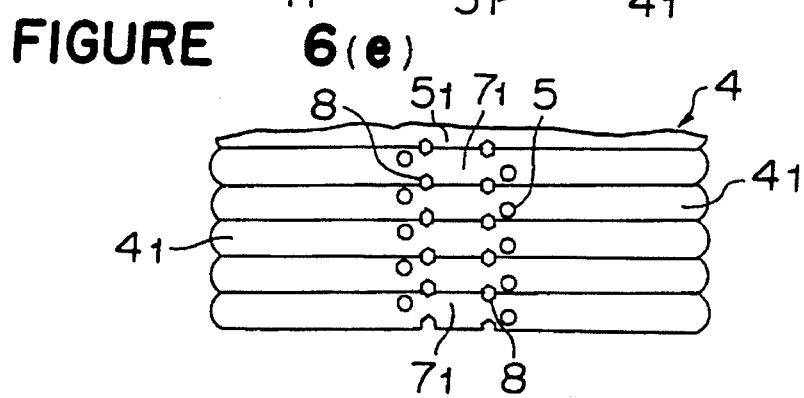

REEL SPRING FOR TAPE CASSETTE AND METHOD FOR PREPARING IT

BACKGROUND OF THE INVENTION

The present invention relates to a reel spring which urges a pair of tape reels in a video tape cassette, in particular a cassette housing to be used in a recording or play device such as a video cassette recorder, and a method for preparing it.

DISCUSSION OF THE BACKGROUND

In the past, such a tape cassette has a reel spring housed therein to press a pair of tape cassette reels. The reel spring is a leaf spring which is made of a nonmagnetic metal plate such as SUS 304 because the reel spring is used in the vicinity of a magnetic tape. In order to obtain a reel pressing force in accordance with standards, many shapes have been proposed. It is known that the reel spring is stamped out of a thin metal plate.

As proposed in Japanese Unexamined Utility Model Publication No. 79983/1982 and U.S. Pat. No. 4770367, tape cassettes with such a reel spring installed therein have obtained cost savings through better stock utilization in terms of two dimensions by improving a blanking die for leaf springs.

With regard to the arrangement of holes which are used to mount such a reel spring to a cassette housing, it can be thought out that mounting holes b are located in a spring "a" in an offset manner in the width direction without locating on a centerline c connecting the centers of paired reels as shown in FIGS. 7 and 8. Such an arrangement of the holes can release stress against a cassette housing d when a pressing force is applied to the spring, and ensure a pitch for a two head type melt-bonding horn easily. If cost savings of the reel spring "a" due to slimness are tried to be accomplished only by narrowing the reel spring in the width direction, the holes b could have part cut, making notches e as shown in FIG. 9. It causes poor melt-bonding or trouble with coming-off of the spring. This means that only slight slimming is possible. When usual stamping by use of a press is used to prepare a straight reel spring which has uniform width with respect to the centerline c connecting the centers of the reels, such preparation is necessarily accompanied by scraps, causing waste parts in a stock, which is one of the factors against cost savings.

SUMMARY OF THE INVENTION

It is an object of the present invention to eliminate the disadvantages as stated earlier, and to provide a reel spring capable of realizing cost savings by slimness, exhibiting the same functions as the conventional ones, improving productivity remarkably, having stability in melt-bonding to a cassette housing, satisfying required melt-bonding strength in a sufficient manner, and making a tape cassette highly reliable.

It is another object of the present invention to provide a method for preparing a reel spring for tape cassettes, capable of lowering cost significantly.

The foregoing and other objects of the present invention have been attained by providing a reel spring for tape cassettes, comprising a substantially flat, central base portion;

end portions extending from opposite edges of the base portion, the end portions bending with respect to the plane including the base portion, the end portions having contact points for urging a pair of tape reels at reel centers; and at least two mounting holes which are formed in the base portion at opposite sides with respect to a tape reel centerline connecting the reel centers and in such a manner to be spaced in the direction of the tape reel centerlines, and which is used for melt-bonding with the cassette housing;

wherein the base portion is arranged so as to have a center laid on the tape reel centerline; the respective end portions are arranged so as to have their centerlines passed through the respective contact points, extended in parallel with each other and deviated with respect to the tape reel centerlines, and the width of the base portion is substantially the same as that of the end portions.

It is preferable that the whole shape is symmetric with respect to the center of the base portion.

It is preferable that the end portions have substantially the same width throughout its entire length.

It is preferable that the end portions have semicircular edges.

The objects have also been attained by a reel spring for tape cassettes including:

a melt-bonding portion in a central portion of a leaf reel spring which houses a pair of tape reels and contacts the centers of the tape reels, the melt-bonding portion formed with two melt-bonding holes which are located at opposite sides in a width direction with respect to a tape reel centerline and in such a manner to be spaced in a longitudinal direction; and spring end portions extended from the melt-bonding portion toward the reel centers;

wherein the contact points of the spring end portions and the reel centers correspond with the tape reel centerline, the melt-bonding portion is deviated with respect to the tape reel centerline in the width direction, and the width of the melt-bonding portion is substantially the same as that of the end portions.

The objects of the present invention have also been attained by providing a method for preparing a reel spring for tape cassettes, which comprises the steps of; stamping out i) at least two mounting holes at a part forming base portions of reel springs in a central portion of a stock so that the holes are located at opposite sides with respect to a tape reel centerline connecting reel centers and in a spaced manner in the direction of the tape reel centerline, and ii) a plurality of positioning holes in the vicinity of the mounting holes in the stock;

cutting the stock up to the positioning holes from opposite edges of the stock so that the cutting is made with the same width as the width of a reel spring end portion, along separation lines which deviate with respect to the tape reel centerline, extend in parallel with one another and pass in the vicinity of the mounting holes, the separation lines including separating lines for reel spring end portions at one side and separation lines for reel spring end portions at the other side which are out of alignment;

bending the reel spring end portions; and cutting portions of the stock between the positioning holes with substantially the same width as the width of the reel spring end portions, along cutting lines which are in parallel with one another.

The objects have also been attained by a method for preparing a reel spring for tape cassettes, which comprises:

a press step for stamping out, in a strip-like stock for reel springs, leading edges of spring end portions, and mounting holes and positioning holes in a spaced manner in a width direction;

a shearing for cutting the stock from opposite edges of the stock up to the positioning holes toward the positioning holes in parallel and side by side with the same width, past the vicinity of the melt-bonding holes which are formed in the spaced manner in the width direction;

a bending step for bending the spring end portions in a curved shape; and a cutting process for cutting portions of the stock between the positioning holes with the same width as the spring end portions in a parallel pattern.

The present invention can narrow the width of a reel spring in a practical manner, minimize scrap portions to decrease the required material volume, allow the reel spring to be installed in a cassette housing without any change in melt-bonding location, and ensure stability easily without lowering melt-bonding strength.

In addition, the present invention can prepare, in an economical manner and in high volume production, a reel spring which can provide a highly reliable tape cassette.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6a–6e are views showing production steps of the reel spring, FIG. 6a being a plan view of a part of a stock, FIG. 6b a plan view showing press step, FIG. 6c being a plan view showing a cutting step, FIG. 6d being a plan view and side view showing a bending step, and FIG. 6e being a plan view a separation step;

DETAILED DESCRIPTION OF THE PREFERRED EMBODIMENTS

Figure 1:
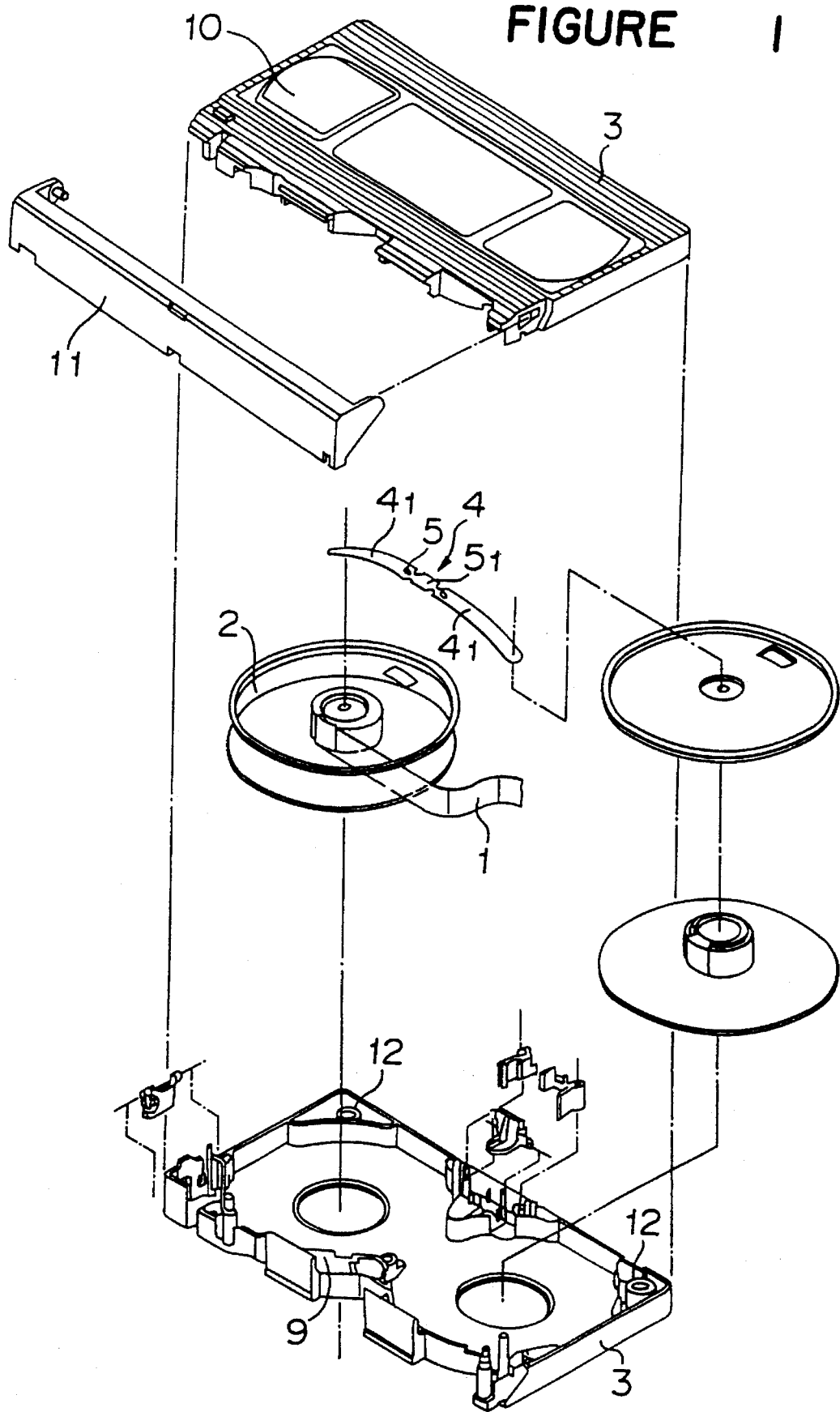
FIG. 1 is a perspective view of an embodiment of the reel spring according to the present invention in a disassembled manner.
Figure 2:
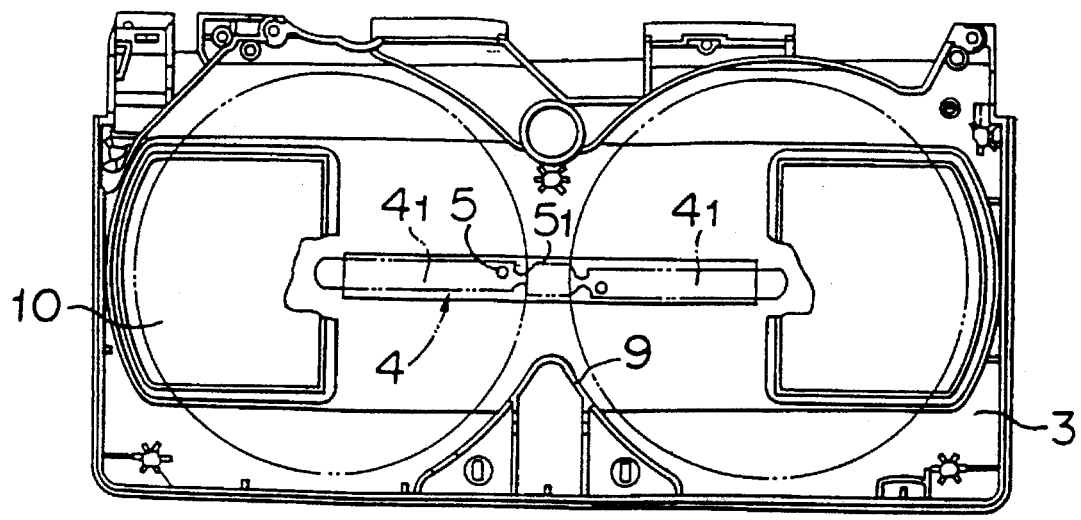
FIG. 2 is a plan view of an inner surface of an upper cassette housing showing how to use the reel spring of FIG. 1.
Figure 3:
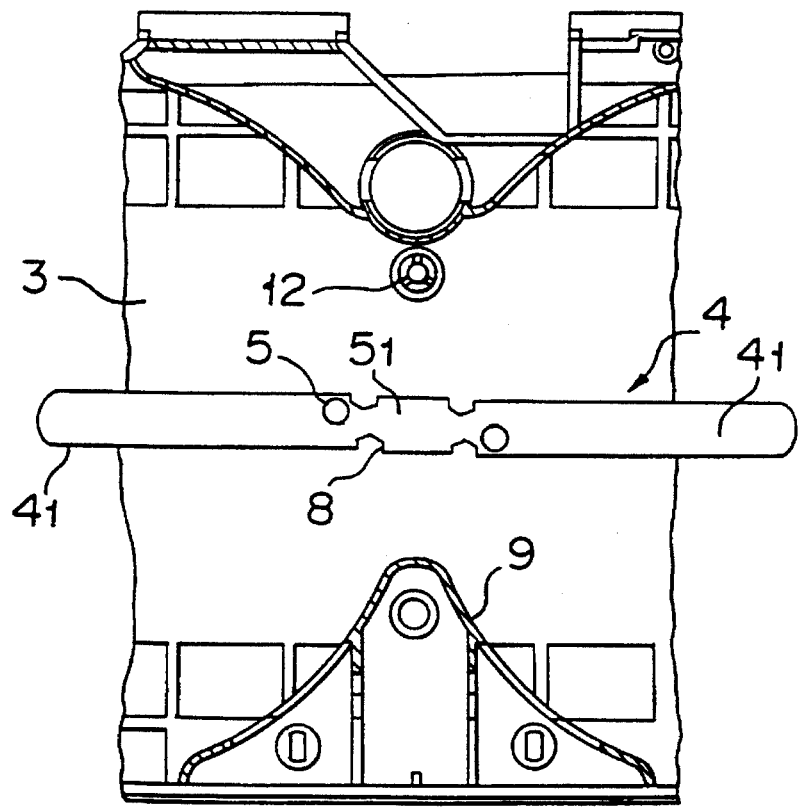
FIG. 3 is an enlarged plan view of a part shown in FIG. 2.
Figure 4:
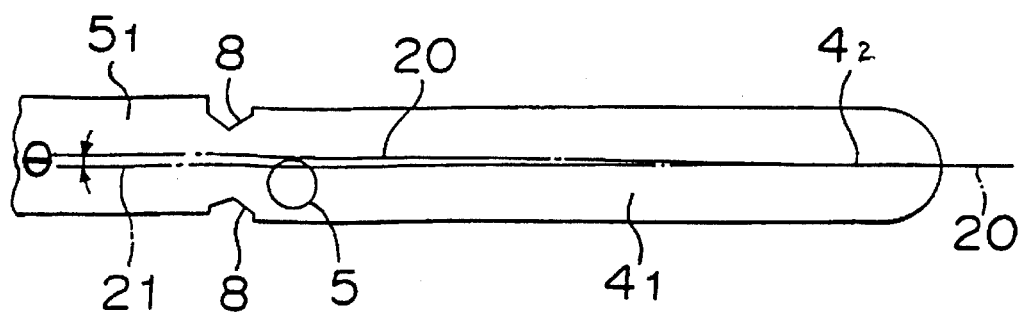
FIG. 4 is an enlarged plan view, showing a part of the reel spring shown in FIG. 3.

Referring now to the drawings, wherein like reference numerals designate identical or corresponding parts throughout the several views, and more particularly to FIGS. 1–4 thereof, there is shown a typical example of the reel spring of the present invention. A pair of reels 2 or hubs with a tape 1 wound thereon is housed so as to be rotatable in a cassette housing. The reel spring 4 according to the present invention is used to press the reel 2 or the hubs. The reels spring 4 has two holes 5 formed in a central portion thereof. The holes receive bosses which are formed on an inner surface of the cassette housing 1. The reel spring and bosses are coupled by use of a melt-bonding horn.

The reel spring 4 according to the present invention has a central portion including a substantially flat base portion 51, or melt-bonding portion so that the center of the melt-bonding portion lies on a tape reel centerline 20 connecting the reel centers of the paired tape reel. The melt-bonding portion has two mounting holes 5, 5 formed therein at opposite sides in the width direction with respect to the tape reel centerline and in such a manner to be spaced in the direction of the tape reel centerline. The reel spring has end portions, or spring end portions $4_1$, $4_1$ extended toward the respective centers of the reels therefrom. The spring end portions are bent with respect to the plane including the meltbonding portions. Both spring end portions $4_1$, $4_1$ have contact points $4_2$ which press the paired reels or hubs housed in the cassette housing 3 at the locations of the respective reel centers. The respective contact points lie on the point where a centerline 21 of the spring end portions $4_1$ along the longitudinal direction intersects the tape reel centerline 20 (see FIG. 4). The spring end portions are arranged so that the centerline 21 of each end portion is offset or deviates in a width direction with respect to the tape reel centerline 20. The width of the melt-bonding $5_1$ is substantially the same as that of the spring end portions $4_1$. The spring end portions have a substantially equal width throughout its entire length as shown. Each spring end portion has a semi-circular edge. The reel spring is shaped so that the whole shape is point-symmetric with respect to a point at the center of the melt-bonding portion.

Figure 5A:
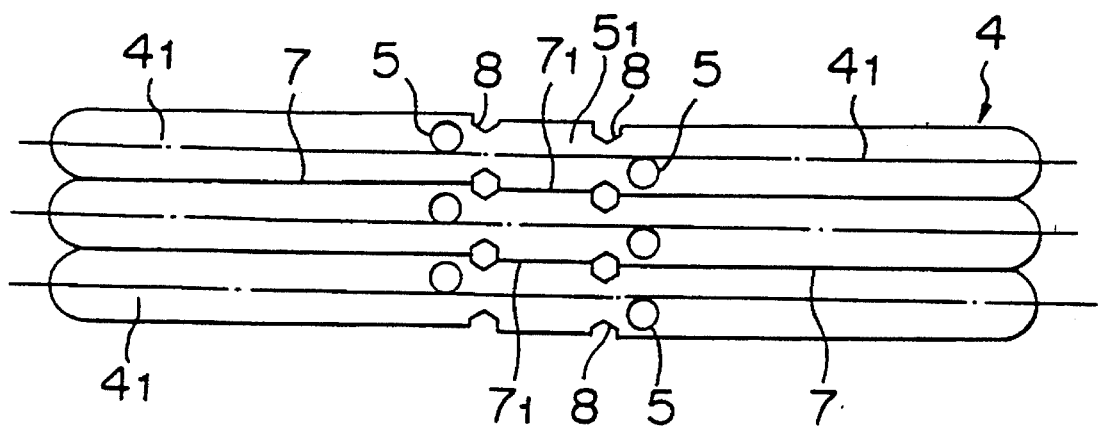
FIG. 5A is an enlarged plan view showing a part of a blank layout for the reel spring shown in FIG. 3.
Figure 9:
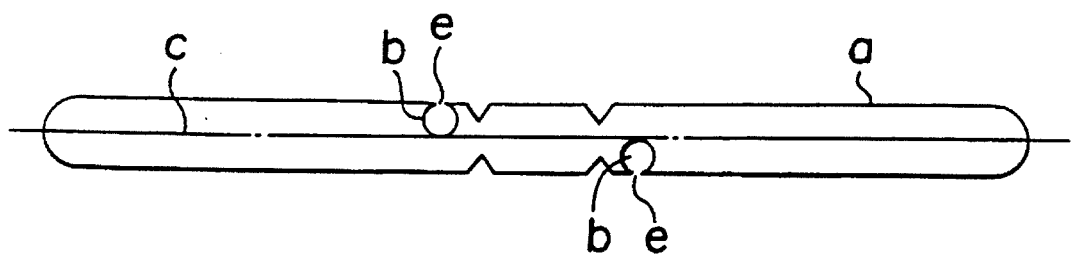
FIG. 9 is a plan view of the reel spring in FIG. 7 which is slimmed.

The reel spring 4 is prepared from a flat stock 6 for leaf spring. The centerline 21 which connects the center of the melt-bonding portion $5_1$ at the formation of the holes 5 and the center of the leading edge of the corresponding one of the spring end portions $4_1$ in the width direction (i.e. the corresponding one of the contact points) intersects at an angle of θ, e.g. 1–2 deg, preferably 1.5 deg, to the reel centerline 20 (see FIG. 4). As shown in FIG. 5A, the reel springs are laid out in the stock so as to adjoin continuously. The reel springs 4 are cut along boundary separation lines 7 in the width direction. The boundary separation lines also form parts of the profile of the spring end portions. The spring end portion $4_1$ of each reel spring are cut one after another so that the distance between the opposite side edges of the spring end portion is, throughout its length, substantially equal, e.g. 7 mm in width wherein the leading edge is rounded to a radius of 3.5 mm, thereby shortening a pitch while minimizing scrap portions. In this manner, it is possible to manufacture reel springs having a narrow width without giving any modification in the locations of the mounting holes 5, 5 offset in the width direction, and without weakening bonding strength. The reel springs are shaped so that the reel centers correspond with the contact points. The bonding portion of the reel spring has recessed portions as positioning holes 8 formed therein at locations which are inward in comparison with the locations of the holes 5 along the reel centerline 20.

Figure 5B:
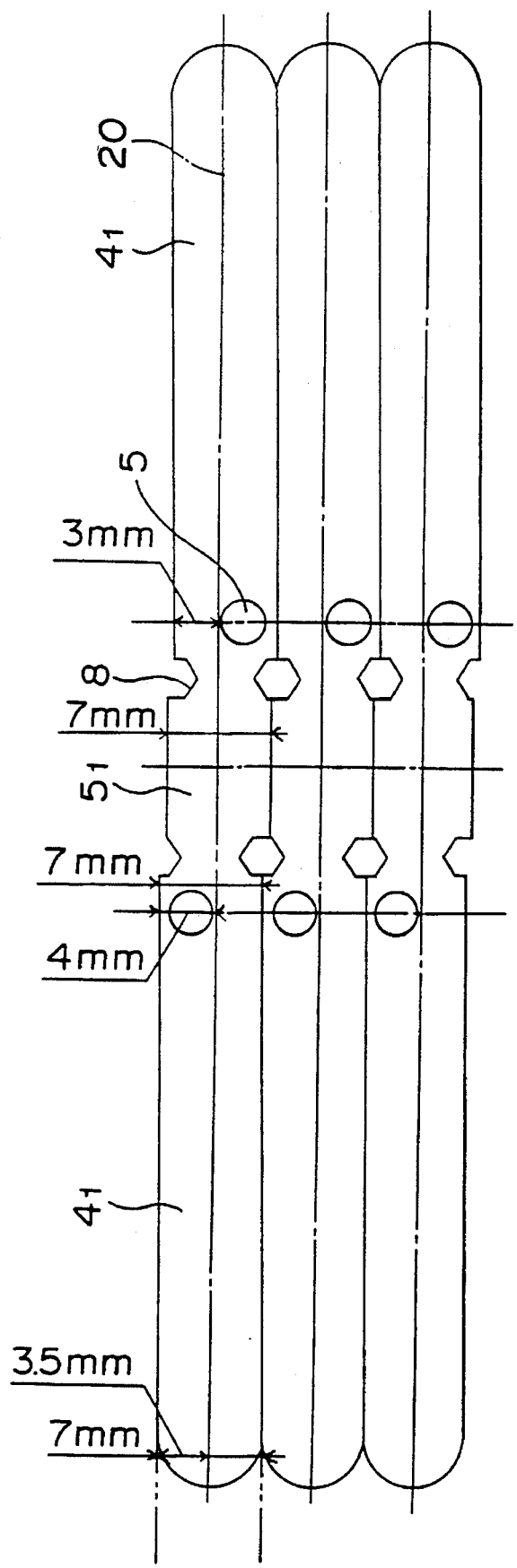
FIG. 5B is an enlarged plan view of the blank layout shown in FIG. 5A.
Figure 7:
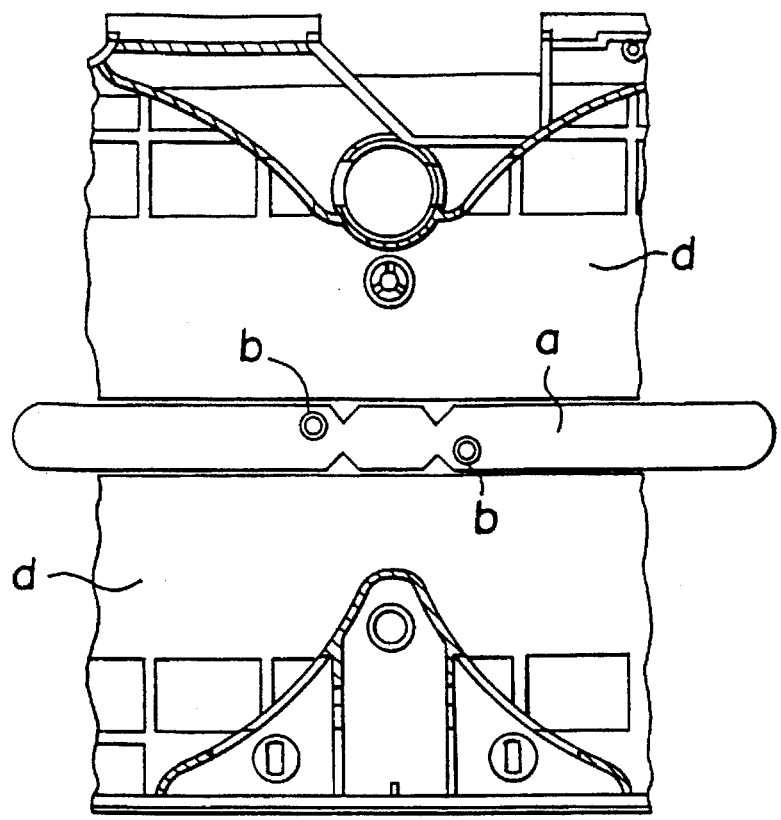
FIG. 7 is an enlarged plan view showing a part of an inner surface of an upper cassette housing wherein mounting holes do not lie on a centerline connecting the centers of reels.
Figure 8:
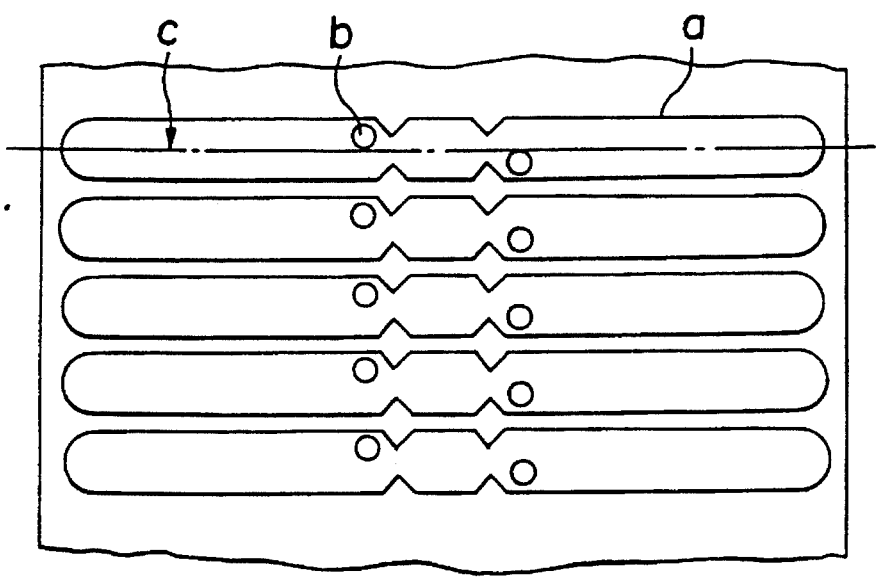
FIG. 8 is a plan view showing a part of a blank layout for the reel spring shown in FIG. 7.

The arrangement relation of the melt-bonding portion $5_1$ and the end portions $4_1$, $4_1$ will be explained in a detail. In the case stated just above, as shown in FIG. 5B, the width of the spring end portions $4_1$ with respect to the tape reel centerline 20 is laid out in the stock so as to have 3.5 mm to 3.5 mm at the leading edges, and 3 mm to 4 mm at the formation of the mounting holes. The melt-bonding portion $5_1$ has the same width as that of the spring end portions $4_1$, i.e. 7 mm.

The stock which is used in the production of the reel spring according to the present invention is a strip-shaped rolled plate of a spring material made of a stainless steel or a phosphor bronze. The production uses a mechanical press which deals with stamping, cutting and bending such a rolled plate.

The stock is fed into the press while being guided at opposite edges on the right and left side on FIG. 6a, and the following steps are carried out:

1) i) At least two mounting holes are stamped out of the stock at a part forming base portions of reel springs in a central portions of the stock so that holes are located at the opposite sides with respect to the tape reel centerline and in a spaced manner in the direction of the tape reel centerline ii) And a plurality of positioning holes 8 are stamped out of the stock in the vicinity of the mounting holes 5 and between the mounting holes (see FIG. 6b).

2) The stock is cut up to the positioning holes from the opposite edges of the stock so that the cutting is made with the same width as the width of the reel spring end portion, along separation lines 7 which deviate with respect to the tape reel centerline, extend in parallel with one another and pass in the vicinity of the mounting holes. The separation lines include separation lines for reel spring end portions at one side and separation lines for reel spring end portions at the other side which are out of alignment (see FIG. 6c).

3) The reel spring ends are bend (see FIG. 6d).

4) The portions of the stock between the positioning holes 8 is cut with substantially the same width as the width of the spring end portions, along cutting lines $7_1$ which are in parallel with one another (see FIG. 6e).

It is allowable that in the stamping step semi-circular edges 24 for forming leading edges of the reel spring end portions are stamped out (see FIG. 6b).

When the bending step is carried out while warping the stock in a direction opposite to the bending direction, it is easy to perform the bending step because adjoining reel springs can be prevented from being caught by one another.

The respective steps stated above can be carried out in such a manner that e.g. three reel springs are grouped into one. Although the production of the reel springs is made in such a way to minimize the volume of scraps remarkably, there is no hindrance in feeding the stock because the reel springs are coupled together until the final fourth step.

It is preferable that the size in width can be adjusted between the positioning holes 8, 8.

When the reel spring 4 is melt-bonded to the cassette housing 3, the reel spring should be coupled to the tape cassette so that the centers of the respective leading edges of the reel spring 4, i.e. the contact points lie on the reel centers.

By narrowing the width of a side without the mounting hole 5 and giving a sufficient width to a side with the mounting hole 5 with respect to the tape reel centerline 20, it is possible to maintain stability in reel spring melt-bonding adequately because the mounting hole 5 is prevented from being coupled and the reel spring 4 can be prevented from coming off the tape housing 3.

If at least one of the paired mounting holes 5 is formed to have an elliptical shape which is short in the width direction, it is helpful to absorb an error in size of a melt-bonding boss. The positioning holes 8 which are located on both sides of the spring 4 are left as notches so as to be opposite. The positioning holes 8 are utilized in assembly, more specifically, the positioning holes 8 are helpful to fit reel springs to guides of a mounting device when a reel spring is mounted to a cassette housing.

The tape cassette where the reel spring 4 according to the present invention is used includes the paired reels 2, 2 or the hubs with the tape 1 wound thereon so as to rotatable therein, and mounts the reel spring 4 for pressing the reels 2 to the inner surface of the upper casing of the cassette casing 3 through the mounting holes 5, 5 which are formed at two locations in the longitudinal direction to be offset with respect to the line connecting the reel centers, thereby providing a video tape cassette. The reel spring according to the present invention is also applicable to other types of tape cassettes.

In drawings, reference numeral 9 designates a separation wall. Reference numeral 10 designates a window. Reference numeral 11 designates a front lid which is mounted to be able of opening and closing. Reference numeral 12 designates bosses for coupling.

Obviously, numerous modifications and variations of the present invention are possible in light of the above teachings. It is therefore to be understood that within the scope of the appended claims, the invention may be practiced otherwise than as specifically described herein.

What is claimed is:

1. A reel spring for tape cassettes comprising:

a substantially flat, central base portion;

first and second elongated end portions extending from opposite edges of the base portion, the first and second end portions being bent with respect to a plane of the base portion such that at least part of each of the first and second end portions extends outside of said plane, the first and second end portions having respective first and second contact points respectively positioned adjacent the opposite ends of the spring for urging a pair of tape reels at reel centers; and at least two mounting holes disposed in the base portion at opposite sides of a tape reel centerline wherein said tape reel centerline is a straight line which connects the reel contact points, and wherein said at least two mounting holes are spaced in a longitudinal direction of the reel spring;

wherein the base portion is arranged so as to have a center disposed along the tape reel centerline; the first and second end portions each having a straight centerline, which respectively extend through the respective first and second contact points, the centerline of the first end portion extending at a middle of the first end portion, the centerline of the second end portion extending at a middle of the second end portion, and wherein the centerline of the first end portion is parallel to the centerline of the second end portion, and further wherein the centerlines of the first and second end portions are each offset from the tape reel centerline, and the width of the base portion is substantially the same as that of the first and second end portions, with said width of said base portion extending substantially in a direction transverse to said centerline of said first end portion, and wherein said tape reel centerline is disposed within a width of each of said first and second end portions along an entire length of each of said first and second end portions.

2. A reel spring according to claim 1, wherein the first and second end portions each have substantially the same width throughout the entire length of each of the first and second end portions.

3. A reel spring according to claim 1, wherein a shape of the reel spring is point-symmetric with respect to a point at a center of the base portion.

4. A reel spring according to claim 1, wherein the first and second end portions have semi-circular edges at respective ends of the reel spring.

5. A reel spring as set forth in claim 1, wherein said tape reel centerline intersects each of the centerlines of the first and second end.portions at the respective first and second contact points.

6. A reel spring as set forth in claim 1, the centerlines of the first and second end portions are angularly offset from the tape reel centerline.

7. A leaf reel spring for tape cassettes including:

a melt-bonding portion in a central portion of the leaf reel spring, the melt-bonding portion including two melt-bonding holes which are located at opposite sides in a width direction with respect to a tape reel centerline which is a straight line connecting tape reel contact points respectively located adjacent the opposite ends of the spring and wherein said holes are spaced in a longitudinal direction of the spring, with the longitudinal direction extending substantially along a direction of the tape reel centerline; and first and second elongated end portions which extend from the melt-bonding portion and having respective longitudinally extending straight centerlines which are offset from each other, said first and second end portions, each including one of said contact point at which said first and second end portions respectively contact centers of tape reels, and wherein a lateral center of the melt-bonding portion is offset with respect to the tape reel centerline at a first location at which said melt-bonding portion is connected to said first end portion and at a second location at which said melt-bonding portion is connected to said second end portion, and a width of the melt-bonding portion is substantially the same as that of the first and second end portions, with the width of said melt-bonding portion extending in a direction substantially transverse to said longitudinal direction, and wherein said tape reel centerline is disposed within a width of said first and second end portions along an entire length of said first and second end portions.

8. A reel spring as set forth in claim 7 wherein each of the first and second end portions have a respective centerline, and wherein said tape reel centerline intersects the centerlines of the first and second end portions at the contact points.

9. A reel spring for tape cassettes comprising:

a substantially flat central base;

first and second elongated end portions extending from said base, each of said first and second end portions including a straight centerline, each of said first and second end portions further including first and second edges, and wherein the first and second edges of the first end portion are parallel to the centerline of the first end portion, and the first and second edges of the second end portion are parallel to the centerline of the second end portion, and further wherein the centerline of the first end portion is offset in a width direction with respect to the centerline of the second end portion, with said width direction extending transverse to the centerline of the first end portion, and wherein the first edge of each of the first and second end portions is disposed on a first side of said reel spring, and said second edge of each of said first and second end portions is disposed on a second side of said reel spring;

said base including a first portion adjacent said first end portion, a second portion adjacent said second end portion, and a third portion disposed between said first and second portions;

said first portion of said base having first and second edges which are respectively aligned with the first and second edges of said first end portion;

said second portion of said base having first and second edges which are respectively aligned with the first and second edges of said second end portion;

said third portion of said base having a first edge disposed, with respect to said width direction, between the first edge of said first portion of said base and the first edge of the second portion of said base;

said third portion of said base further including a second edge disposed, with respect to said width direction, between the second edge of said first portion of said base and the second edge of said second portion of said base; and wherein said first and second end portions and said base have substantially equal widths in said width direction and all said edges are portions of the edges of the spring and wherein a straight tape reel centerline which connects tape reel contact points positioned on the end portions adjacent the opposite ends of the spring is disposed within a width of each of said first and second end portions along an entire length of said first and second end portions.

10. A reel spring as set forth in claim 9, wherein said base further includes a first mounting hole in said first portion of said base and a second mounting hole in said second portion of said base.

11. A reel spring as set forth in claim 10, wherein said base further includes first and second recesses respectively disposed on the first and second sides of said reel spring, said first and second recesses disposed between said first portion of said base and said third portion of said base, said base further including third and fourth recesses respectively disposed on the first and second sides of the reel spring, said third and fourth recesses disposed between said second portion of said base and said third portion of said base.

12. A reel spring as set forth in claim 9, wherein said base further includes first and second recesses respectively disposed on the first and second sides of said reel spring, said first and second recesses disposed between said first portion of said base and said third portion of said base, said base further including third and fourth recesses respectively disposed on the first and second sides of the reel spring, said third and fourth recesses disposed between said second portion of said base and said third portion of said base.

* * * * *